US012709013B2

(12) United States Patent
Huang et al.

(10) Patent No.: US 12,709,013 B2
(45) Date of Patent: Aug. 18, 2026

(54) ROBOT CALIBRATION METHOD AND DEVICE BASED ON EQUIVALENT KINEMATIC MODEL

(71) Applicants: Tianjin University, Tianjin (CN); GSK CNC Equipment Co., Ltd., Guangzhou City (CN)

(72) Inventors: Tian Huang, Tianjin (CN); Yongbin Song, Tianjin (CN); Wenjie Tian, Tianjin (CN); Haitao Liu, Tianjin (CN); Juliang Xiao, Tianjin (CN); Kongfeng Zhu, Tianjin (CN); Shiwei Zhou, Tianjin (CN)

(73) Assignees: Tianjin University, Tianjin (CN); GSK CNC Equipment Co., Ltd., Guangzhou City (CN)

( * ) Notice: Subject to any disclaimer, the term of this patent is extended or adjusted under 35 U.S.C. 154(b) by 255 days.

(21) Appl. No.: 18/715,990

(22) PCT Filed: Dec. 29, 2022

(86) PCT No.: PCT/CN2022/143088

§ 371 (c)(1),
(2) Date: Jun. 3, 2024

(87) PCT Pub. No.: WO2024/031922

PCT Pub. Date: Feb. 15, 2024

(65) Prior Publication Data

US 2026/0166741 A1 Jun. 18, 2026

(30) Foreign Application Priority Data

Aug. 9, 2022 (CN) ........................ 202210946892.9

(51) Int. Cl.
*B25J 9/16* (2006.01)

(52) U.S. Cl.
CPC ........... *B25J 9/1692* (2013.01); *B25J 9/1605* (2013.01)

(58) Field of Classification Search
CPC .............................. B25J 9/1605; B25J 9/1692
See application file for complete search history.

(56) References Cited

U.S. PATENT DOCUMENTS

2006/0254364 A1 11/2006 Matsushita
2015/0266183 A1* 9/2015 Alifragkis ............. B25J 9/1692 700/254

(Continued)

FOREIGN PATENT DOCUMENTS

CN 108527373 A 9/2018
CN 111618853 A 9/2020

(Continued)

OTHER PUBLICATIONS

International Search Report, China National Intellectual Property Administration, Apr. 10, 2023.

*Primary Examiner* — Wade Miles
*Assistant Examiner* — Mohammed Yousef Abuelhawa
(74) *Attorney, Agent, or Firm* — Bay State IP, LLC

(57) ABSTRACT

The present disclosure relates to a robot calibration method based on an equivalent kinematic model and a device thereof. The method includes: calibrating a robot real system with a degree of freedom of $f \leq 6$ and containing multiple types of time-invariant error sources as a kinematic equivalent system with six degrees of freedom; wherein 6-dimensional pose vectors y of output members of the equivalent system and the real system are the same, and the equivalent system includes a forward position solution model: $y=f(\rho(q,\alpha),\beta_0)$; constructing a function relationship between $\rho$ and $\alpha$; acquiring a pose measurement value of the real system; calculating an estimator $\hat{\alpha}_i$, of the adjustable constant parameter vector $\alpha$ in a decoupling manner in a joint (Continued)

space; modifying a driving joint variable corresponding to a received motion trajectory instruction set; and driving the robot to move according to the modified driving joint variable.

10 Claims, 4 Drawing Sheets

(56) References Cited

U.S. PATENT DOCUMENTS

| | | | | |
|---|---|---|---|---|
| 2017/0136626 | A1* | 5/2017 | Wang | G06T 7/74 |
| 2020/0039075 | A1* | 2/2020 | Katsiaris | G01B 5/008 |
| 2020/0055188 | A1* | 2/2020 | Ju | B25J 19/0037 |

FOREIGN PATENT DOCUMENTS

| | | | |
|---|---|---|---|
| CN | 112318498 | A | 2/2021 |
| CN | 113580148 | A | 11/2021 |
| CN | 115008476 | A | 6/2022 |

* cited by examiner

ROBOT CALIBRATION METHOD AND DEVICE BASED ON EQUIVALENT KINEMATIC MODEL

CROSS REFERENCE TO RELATED APPLICATION

This application is for entry into the U.S. National Phase from which priority is claimed under all applicable sections of Title 35 of the Untied States Code including, but not limited to, Sections 120, 363, and 365(c) to International Application No. PCT/CN2022/143088 filed on Dec. 29, 2022, and which in turn claims priority under 35 USC 119 to Chinese Patent Application No. 202210946892.9 filed on Aug. 9, 2022, the contents of which are incorporated by reference herein in its entirety as part of the present application.

TECHNICAL FIELD

The present disclosure relates to the technical field of robot calibration, in particular to a robot calibration method based on an equivalent kinematic model and a device thereof.

BACKGROUND

In recent years, robot processing equipment has been widely used in high-end manufacturing fields such as aerospace and rail transit. Although a robot has many advantages, such as high kinematic flexibility, large working space and low manufacturing cost, the demand for high-precision machining of large complex components still poses a great challenge to its machining ability. The accuracy of a pose of an end is one of the important indexes to measure its machining ability. On the premise of ensuring good repeatability accuracy through manufacturing and assembly, calibration is an effective means to improve the absolute pose accuracy of a robot end member, which involves establishing a function relationship between the pose of the end member, a driving joint variable and a set of adjustable constant parameters, and estimating the adjustable constant parameters with the goal of minimizing the residual between the measured value of the pose of the end member and the predicted value of the model in a finite configuration, so as to accurately predict and compensate for its pose error in any configuration.

At present, the calibration method of identifying kinematic parameters of a real robot system is the most widely used. In such method, the real kinematic parameters between two adjacent connecting rods or the deviation between real and nominal kinematic parameters are usually used as adjustable parameters. For example, in a D-H method, a parameter error of the connecting rod and a zero offset of the driving joint are adjustable parameters. In a local exponential product method, the axis orientation and amplitude errors of an instantaneous screw of the driving joint in an initial configuration are adjustable parameters. Although the above kinematic calibration methods have clear physical meaning, it is difficult for the model used for calibration to be modelled, the identification efficiency is not ideal, and it is difficult to compensate for the pose error of the end resulted from non-modeling errors.

SUMMARY

In order to at least overcome the problems in the kinematic calibration methods in related technologies to some extent that it is difficult for the model to be modelled, the identification efficiency is not ideal, and it is difficult to compensate for the pose error of the end resulted from non-modeling errors, the present disclosure provides a robot calibration method based on an equivalent kinematic model and a device thereof.

The scheme of the present disclosure is as follows.

According to a first aspect of an embodiment of the present disclosure, there is provided a robot calibration method based on an equivalent kinematic model, including: calibrating a robot real system with a degree of freedom of f≤6 and containing multiple types of time-invariant error sources as a kinematic equivalent system with six degrees of freedom; wherein 6-dimensional pose vectors y of output members of the equivalent system and the real system are the same, and the equivalent system includes a forward position solution model: $y=f(\rho(q,\alpha),\beta_0)$; where $\beta_0$ is a nominal value of a known kinematic parameter of the real system, $\rho$ is a total joint variable of the equivalent system, q is a driving joint variable of the real system, and $\alpha$ is an adjustable constant parameter vector;

constructing a function relationship between $\rho$ and $\alpha$:

$$\rho(q,\alpha)=\rho_0+Z(q)\alpha,\ \rho_0=\begin{pmatrix} q \\ 0 \end{pmatrix},\ Z(q)=\mathrm{diag}[z(q)]_6;$$

- where z(q) indicates a function vector with the same dimension as $\alpha$ in which q is an independent variable;
- acquiring a pose measurement value of the real system, and based on an iterative algorithm, calculating an estimator $\hat{\alpha}_i$ of the adjustable constant parameter vector $\alpha$ in a decoupling manner in a joint space;
- modifying a driving joint variable corresponding to a received motion trajectory instruction set according to z(q) and $\hat{\alpha}_i$; and
- driving the robot to move according to the modified driving joint variable.

Preferably, acquiring a pose measurement value of the real system, and based on an iterative algorithm, calculating an estimator $\hat{\alpha}_i$ of the adjustable constant parameter vector $\alpha$ in a decoupling manner in a joint space includes:

- acquiring a pose measurement value $y_j$ of an output member at a configuration j (j=1~N) of the real system;
- assuming that $$\hat{\alpha}_i^k\ (i=1\sim 6,\ k=0,1,\ldots)$$

is a k-th iteration value of $\alpha_i$, and assuming that $$\hat{\alpha}_i^0=0;$$

performing first-order Taylor expansion on $f(\rho(q_j,\hat{\alpha}),\beta_0)$ in a neighborhood of $$\hat{\alpha}_i^k,$$

and expressing a residual of $y_j$ and $f(\rho(q_j,\hat{\alpha}),\beta_0)$ as:

$$e_j^k=\Delta y_j^k-T_j^k Z_j\Delta\alpha^k$$

-continued $$\Delta y_j^k = y_j - f(\rho(q_j, \hat{\alpha}^k), \beta_0),$$

$$T_j^k = \frac{\partial f(\rho(q_j, \alpha), \beta_0)}{\partial \rho}\Big|_{\alpha=\hat{\alpha}_k}, Z_j = Z(q_j), \Delta\alpha^k = \alpha - \hat{\alpha}^k;$$

realizing decoupling in the joint space by simultaneous left multiplication of $$(W_j^k)^T = (T_j^k)^{-1}$$

at both ends of $$e_j^k = \Delta y_j^k - T_j^k Z_j, \Delta\alpha^k,$$

and grouping and integrating a multivariate linear regression equation;

$$\Delta\rho_i^k = H\Delta\alpha_i^k + \varepsilon_i^k,$$

$$\Delta\rho_i^k = \begin{pmatrix} (w_{1,i}^k)^T \Delta y_1^k \\ \vdots \\ (w_{N,i}^k)^T \Delta y_N^k \end{pmatrix}, H = \begin{bmatrix} z_1 \\ \vdots \\ z_N^T \end{bmatrix}, \varepsilon_i^k = \begin{pmatrix} (w_{1,i}^k)^T e_1^k \\ \vdots \\ (w_{N,i}^k)^T e_N^k \end{pmatrix};$$

wherein $$w_{j,i}^k$$

indicates an i-th column of a matrix $$W_j^k;$$

obtaining $$\Delta\alpha_i^k$$

by calculation based on a preset algorithm;

updating $$\hat{\alpha}_i^k =: \hat{\alpha}_i^k + \Delta\hat{\alpha}_i^k,$$

executing iterative loop until convergence, and taking a convergence value as the estimator $\hat{\alpha}_i$.

Preferably, acquiring a pose measurement value $y_j$ of an output member at the configuration j (j=1~N) includes:

evenly selecting $N>n=\dim(\alpha_i)$ measurement configurations in a robot workspace, and determining a pose instruction set $\{y_0\}$ corresponding to the configuration;

obtaining an inverse position solution model $f^{-1}(\cdot)$ of the equivalent system according to the forward position solution model $f(\cdot)$ of the equivalent system;

based on the inverse position solution model $f^{-1}(\cdot)$ of the equivalent system, mapping a pose vector $y_{0,j}$ of the output member at a configuration j to the total joint variable $\rho_{0,j}$ of the equivalent system;

constructing a driving joint variable $q_j$ of the real system according to the total joint variable $\rho_{0,j}$ of the equivalent system;

driving the robot to traverse the configuration j;

measuring coordinates of a preset measuring target point of a calibration gauge on the robot in a calibration coordinate system;

obtaining a pose measurement value $y_j$ of the output member at a configuration j (j=1~N) based on the coordinate.

Preferably, modifying a driving joint variable corresponding to a received motion trajectory instruction set according to z(q) and $\hat{\alpha}_i$ includes:

based on the inverse position solution model $f^{-1}(\cdot)$ of the equivalent system, mapping the received motion trajectory instruction set to an instruction set $\{\rho_0\}$ of the equivalent system for the driving joint variable;

constructing an instruction set {q} of the real system for the driving joint variables according to $\{\rho_0\}$;

modifying {q} according to z(q) and $\hat{\alpha}_i$ based on a pre-constructed error compensation modification formula $$\{q_{m,i}\} = \{q_i - z^T(q)\hat{\alpha}_i\},$$

in which i=1~5, and obtaining the modified instruction set $\{q_{m,i}\}$ of the driving joint variable.

Preferably, the method further includes:

interpolating the modified instruction set $\{q_{m,i}\}$ of the driving joint variable.

Preferably, constructing a function relationship between ρ and α includes:

expressing each component $\rho_i$ (i=1~6) of ρ as a quadratic response surface function with each component $q_1$~$q_5$ of q as an independent variable:

$$\rho_i = q_i + \mu_{0,i} + \sum_{j=1}^{5}\mu_{j,i}q_j + \sum_{j=1}^{5}\sum_{k=j}^{5}\mu_{j,k,i}q_jq_k,\ i = 1\sim 6,\ q_6 = 0;$$

where $\mu_{*,*,i}$ indicates coefficients of the quadratic response surface;

obtaining the following formula by variable substitution:

$\rho_i = q_i + z^T(q)\alpha_i$; where i=1~6, $q_6=0$;

wherein:

$$z(q) = (1\ \ z_1\ \cdots\ z_n)^T = (1\ \ q_1\ \cdots\ q_5\ \ q_1^2\ \ q_1q_2\ \cdots\ q_5^2)^T,$$

$$\alpha_i = (\alpha_{0,i}\ \ \alpha_{1,i}\ \cdots\ \alpha_{n,i})^T = (\mu_{0,i}\ \ \mu_{1,i}\ \cdots\ \mu_{5,i}\ \ \mu_{1,1,i}\ \ \mu_{1,2,i}\ \cdots\ \mu_{5,5,i})^T,\ i = 1\sim 6.$$

Preferably, the function relationship between ρ and α is a linear function or a nonlinear function.

Preferably, obtaining $$\Delta\alpha_i^k$$

by calculation based on a preset algorithm includes:

obtaining $$\Delta\alpha_i^k$$

by calculation based on a damped least square method.

Preferably, prior to acquiring a pose measurement value of the real system, and based on an iterative algorithm, calculating an estimator $\hat{\alpha}_i$ of the adjustable constant parameter vector α in a decoupling manner in a joint space, the method further includes:

constructing an analytical model or a numerical model of full kinematic Jacobian $T=\partial f/\partial\rho$ and full dynamic Jacobian $W=T^{-T}$ of the equivalent system.

According to a second aspect of an embodiment of the present disclosure, there is provided a robot calibration device based on an equivalent kinematic model, including:

a processor and a memory;

wherein the processor is connected with the memory through a communication bus;

wherein the processor is configured to call and execute a program stored in the memory;

the memory is configured to store a program, and the program is at least configured to execute the robot calibration method based on the equivalent kinematic model as described in any one of the above.

The technical scheme provided by the present disclosure can include the following beneficial effects. In the robot calibration method based on the equivalent kinematic model in the present disclosure, a robot real system with a degree of freedom of $f\leq 6$ and containing multiple types of time-invariant error sources is calibrated as a kinematic equivalent system with six degrees of freedom, so that the pose error of the output member resulted from each type of time-invariant error sources can be compensated for, and the method has better engineering practicability. 6-dimensional pose vectors y of output members of the equivalent system and the real system are the same, and the equivalent system includes a forward position solution model: $y=f(\rho(q,\alpha),\beta_0)$; where $\beta_0$ is a nominal value of a known kinematic parameter of the real system, ρ is a total joint variable of the equivalent system, q is a driving joint variable of the real system, and α is an adjustable constant parameter vector. In the present disclosure, it is not necessary to establish a kinematic model with kinematic parameters or its error parameters of the real system as adjustable parameters, and the procedure of judging and deleting redundant parameters in the model is omitted, thus greatly simplifying the modeling procedure of the identification model for calibration. A function relationship between ρ and α is constructed:

$$\rho(q,\alpha)=\rho_0+Z(q)\alpha,\ \rho_0=\begin{pmatrix} q \\ 0 \end{pmatrix},\ Z(q)=\mathrm{diag}[z(q)]_6;$$

where z(q) indicates a function vector with the same dimension as α in which q is an independent variable. In the present disclosure, a pose measurement value of the real system is acquired on the basis of the constructed function relationship between ρ and α, and based on an iterative algorithm, an estimator $\hat{\alpha}_i$ of the adjustable constant parameter vector α is calculated in a decoupling manner in a joint space. In the present disclosure, decoupling identification is carried out in the joint space, which can greatly improve the identification efficiency and the robustness of the identification result. In the present disclosure, for the received motion trajectory instruction set, the error compensation and modification can be performed on the driving joint variable corresponding to the motion trajectory instruction set online only according to z(q) and $\hat{\alpha}_i$, and the robot can be driven to move according to the modified driving joint variable.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

Figure 1:
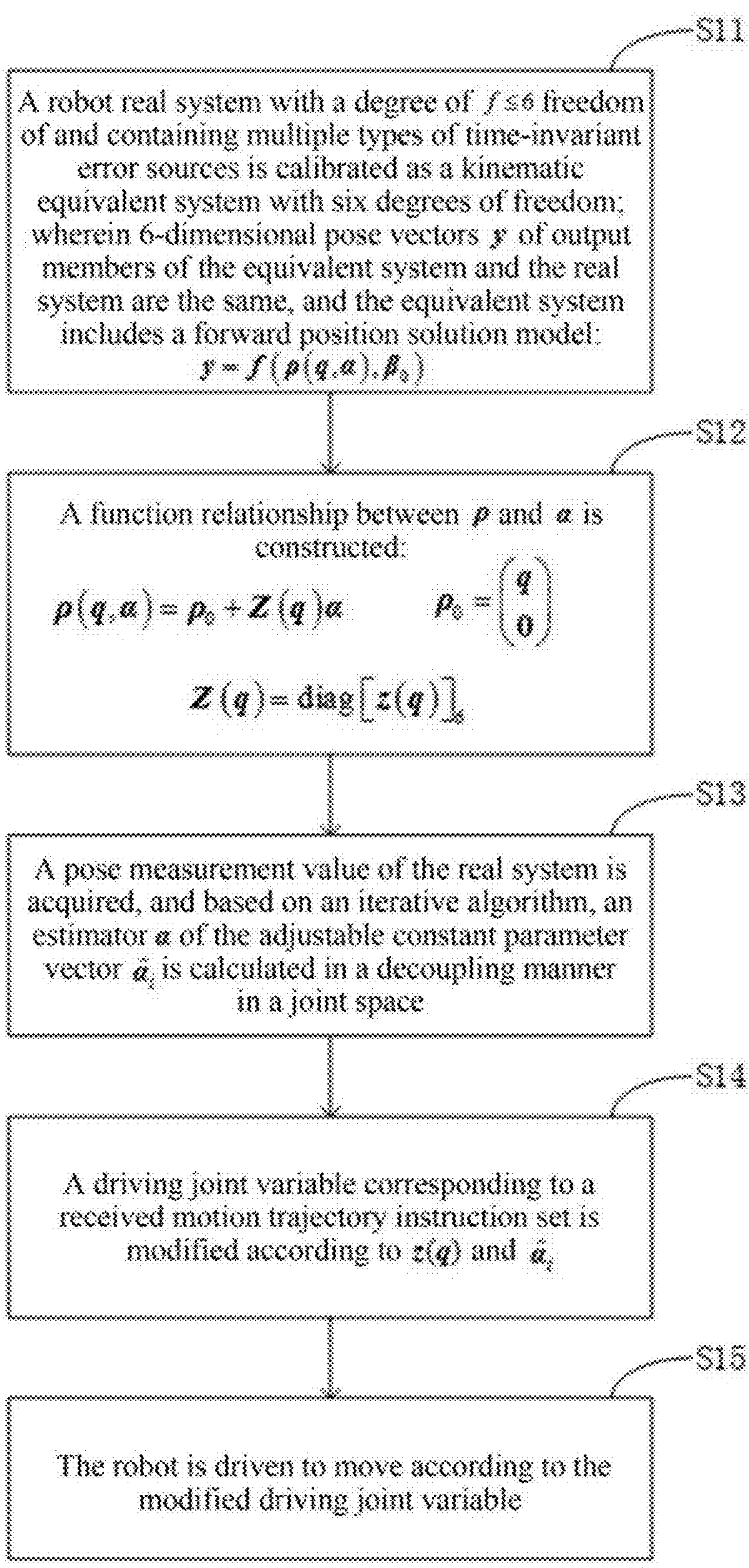
FIG. 1 is a flowchart of a robot calibration method based on an equivalent kinematic model according to an embodiment of the present disclosure.

REFERENCE NUMERALS processor—21; memory—22.

DETAILED DESCRIPTION OF THE EMBODIMENTS

The exemplary embodiments will now be described in detail, examples of which are illustrated in the accompanying drawings. When the following description refers to the accompanying drawings, the same numbers in different accompanying drawings indicate the same or similar elements unless otherwise indicated. The embodiments described in the following exemplary embodiments do not represent all embodiments consistent with the present disclosure. Rather, the embodiments are merely examples of devices and methods consistent with some aspects of the present disclosure as detailed in the appended claims.

Embodiment 1

A robot calibration method based on the equivalent kinematic model, as shown FIG. 1, includes the following steps.

S11: a robot real system with a degree of freedom of $f\leq 6$ and containing multiple types of time-invariant error sources is calibrated as a kinematic equivalent system with six degrees of freedom; wherein 6-dimensional pose vectors y of output members of the equivalent system and the real system are the same, and the equivalent system includes a forward position solution model: $y=f(\rho(q,\alpha),\beta_0)$; where $\beta_0$ is a nominal value of a known kinematic parameter of the real system, $\rho$ is a total joint variable of the equivalent system, q is a driving joint variable of the real system, and $\alpha$ is an adjustable constant parameter vector.

In this embodiment, the robot system has a degree of freedom of $f\leq 6$ and contains multiple types of time-invariant error sources. The equivalent system can be regarded as a mathematical 6-degree-of-freedom kinematic equivalent system of the real system.

The equivalent system in this embodiment has three characteristics: the 6-dimensional pose vectors of output members of the equivalent system is the same as those the real system. The kinematic parameters take the nominal values of the real system kinematics parameters and are known constant vectors. The total joint variables $\rho=(\rho_1 \ldots \rho_6)^T$ are expressed as the functions of the driving joint variable $q=(q_1 \ldots q_f)^T$ and a set of adjustable constant parameter vectors $$\alpha = (\alpha_1^T \; \cdots \; \alpha_6^T)^T$$

of the real system.

The real system and equivalent system in this embodiment are exemplified.

Figure 2:
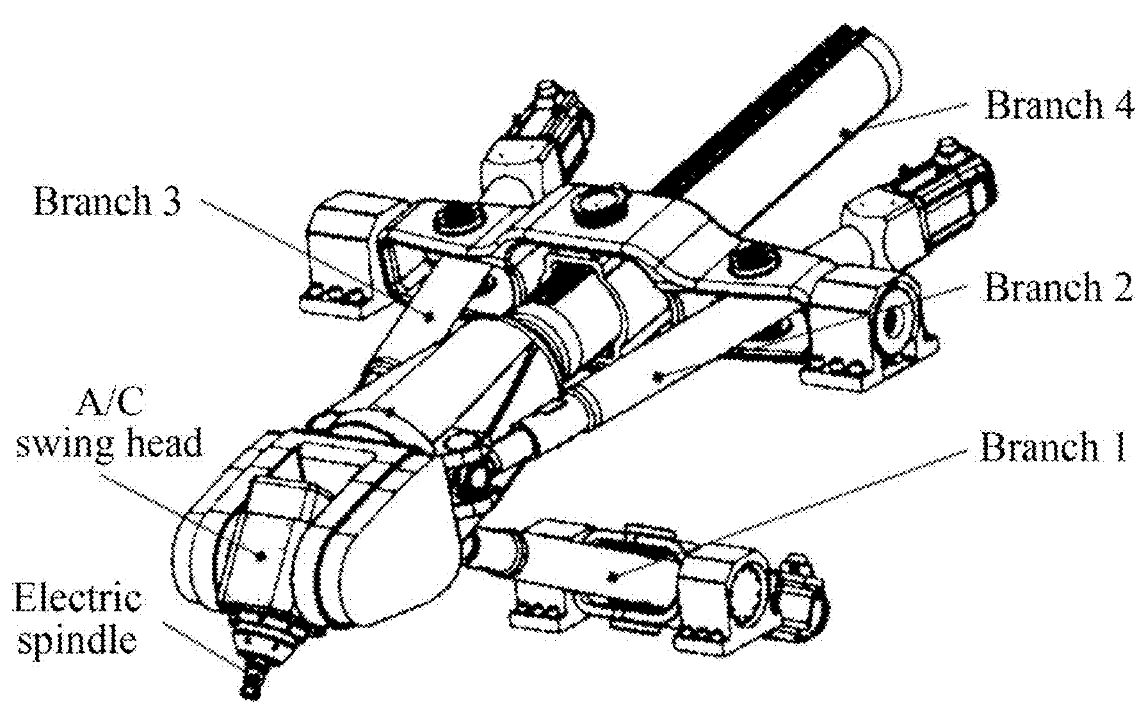
FIG. 2 is a schematic diagram of CAD solid modeling of a robot according to an embodiment of the present disclosure.
Figure 3:
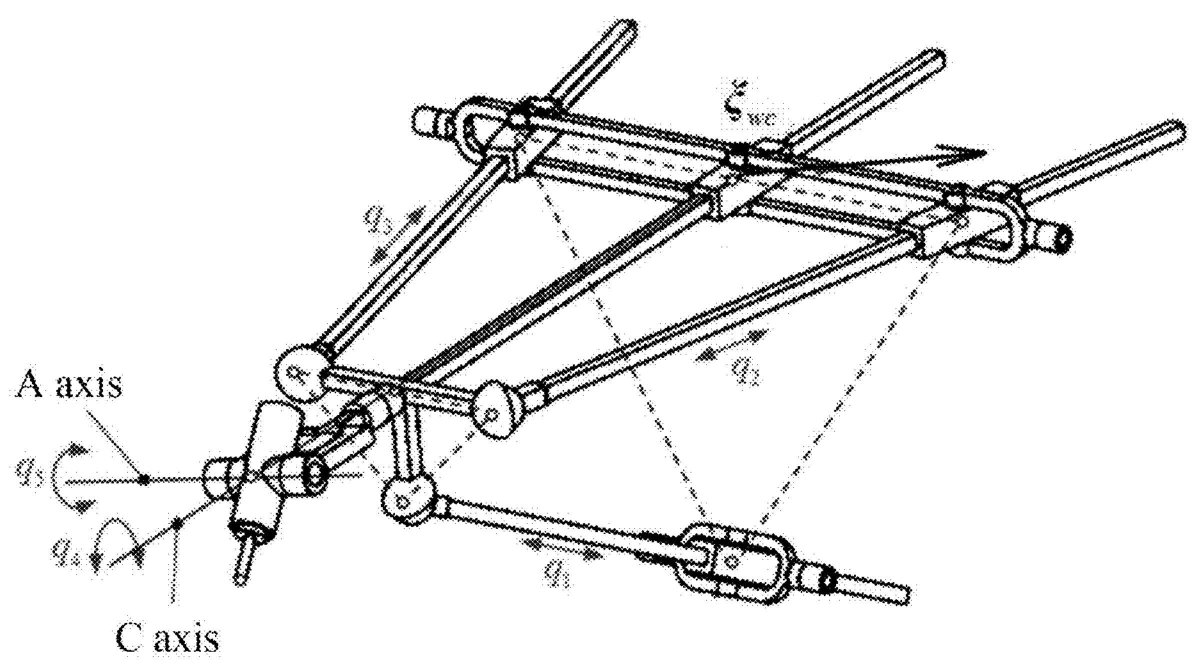
FIG. 3 is a simplified diagram of a mechanical structure of a robot according to an embodiment of the present disclosure.

FIG. 2 is a CAD solid modeling of an exemplary robot, which is formed by connecting a positional 1T2R (T stands for translation, R stands for rotation) parallel mechanism and an A/C swing head in series. The motorized spindle in FIG. 2 is the output member described in this embodiment. In this embodiment, three driving branches in the parallel mechanism are denoted as branch 1, branch 2 and branch 3, and the kinematic chain consisted of the driven branch and the A/C swing head is denoted as branch 4. FIG. 3 shows a simplified diagram of the mechanism structure of the robot. In FIG. 3, $q_i$ (i=1~3) is a variable rod length of the driving branch i, and 94 and Is are the output rotation angles of the C axis and the A axis.

Figure 4:
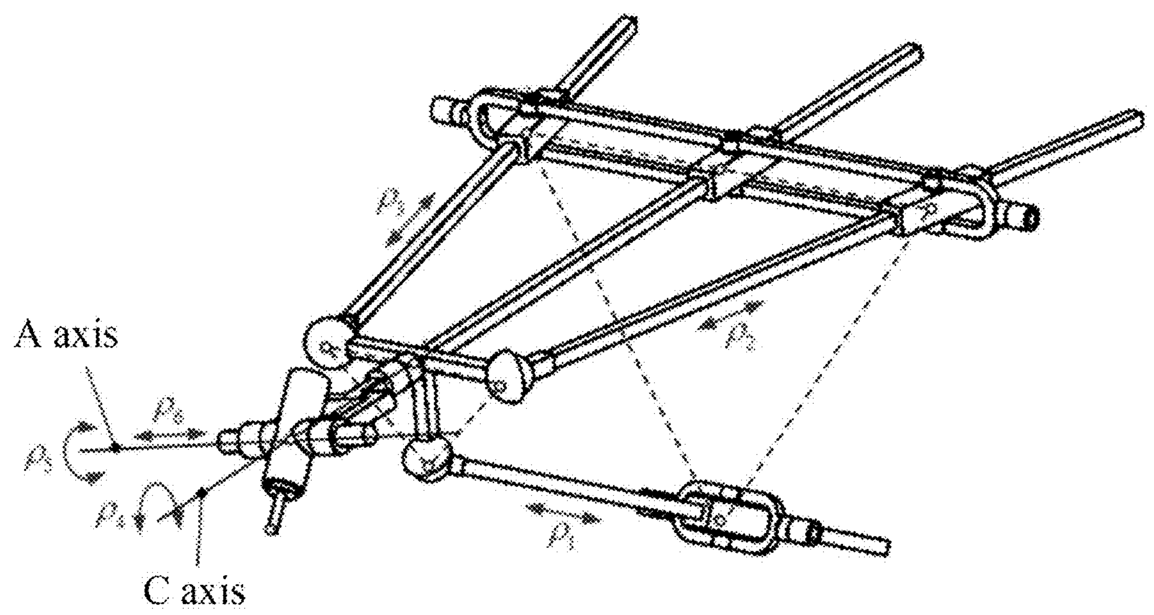
FIG. 4 is a simplified diagram of a mechanical structure of a robot with a virtual joint according to an embodiment of the present disclosure.

Considering that the degree of freedom of the real system is f=5, and the kinematic parameters of the equivalent system are agreed to be the nominal values of the kinematic parameters of the real system in this embodiment, in order to make the output members of the equivalent system and the real system have the same pose, a virtual joint is added to the real system in this embodiment. The principle of adding the virtual joint is as follows. First, according to the reciprocal relationship between allowable motion screw and the constrained force screw, the constrained force screw acting on the output member of the real system is determined, then the type and the orientation of the restricted motion screw are determined according to the principle of one-to-one correspondence between the restricted motion screw and the constrained force screw, and finally the restricted motion screw is visualized by the virtual joint. As shown in FIG. 3, the constrained force screw $\xi_{we}$ is a pure force passing through the point $B_4$ and parallel to the A axis, so that the virtual joint is a moving joint with the direction parallel to the A axis, as shown in FIG. 4. $\rho_1$~$\rho_5$ in FIG. 4 corresponds to $q_1$~$q_5$ in FIG. 3 one by one. $\rho_6$ is the linear displacement of the motorized spindle with respect to the A-axis member along the restricted translation direction. In addition, for this embodiment, the kinematic parameters $\beta_0$ of the equivalent system include the nominal dimensions and structural angle parameters of the parallel mechanism and the A/C swing head.

On this basis, the analytical model or the numerical model of the forward position solution $f(\rho,\beta_0)$ of the equivalent system can be established by using the robot mechanism or the CAD software.

S12: a function relationship between $\rho$ and $\alpha$ is constructed:

$$\rho(q,\alpha) = \rho_0 + Z(q)\alpha,\ \rho_0 = \begin{pmatrix} q \\ 0 \end{pmatrix},\ Z(q) = \mathrm{diag}[z(q)]_6;$$

where z(q) indicates a function vector with the same dimension as $\alpha$ in which q is an independent variable.

In this embodiment, the function relationship between $\rho$ and $\alpha$ can be a linear function or a nonlinear function.

S13: a pose measurement value of the real system is acquired, and based on an iterative algorithm, an estimator $\hat{\alpha}_i$ of the adjustable constant parameter vector $\alpha$ is calculated in a decoupling manner in a joint space.

S14: a driving joint variable corresponding to a received motion trajectory instruction set is modified according to z(q) and $\hat{\alpha}_i$.

S15: the robot is driven to move according to the modified driving joint variable.

Although the kinematic calibration method in the prior art has clear physical meaning, the method also has the following shortcomings.

(1) The process of deriving the forward position solution model with errors is extremely complicated, especially for a robot system with a complex topological structure (such as containing closed-loop constraints)

(2) Redundant parameters in the error model need to be judged and eliminated to meet the minimum requirement of system identification.

(3) There are a large number of parameters to be identified, the solution scale is large, and it is necessary to deal with the ill-conditioned problems of an identification matrix resulted from an inconsistent dimension.

(4) It is difficult to compensate for the pose errors of the end resulted from non-modeling errors (such as elastic deformation of a connecting rod/a hinge, etc.).

In the robot calibration method based on the equivalent kinematic model in this embodiment, a robot real system with a degree of freedom of $f\leq 6$ and containing multiple types of time-invariant error sources is calibrated as a kinematic equivalent system with six degrees of freedom, so that the pose error of the output member resulted from each type of time-invariant error sources can be compensated for, and the method has better engineering practicability. 6-dimensional pose vectors y of output members of the equivalent system and the real system are the same, and the equivalent system includes a forward position solution model: $y=f(\rho(q,\alpha),\beta_0)$; where $\beta_0$ is a nominal value of a known kinematic parameter of the real system, $\rho$ is a total joint variable of the equivalent system, q is a driving joint variable of the real system, and $\alpha$ is an adjustable constant parameter vector. In this embodiment, it is not necessary to establish a kinematic model with kinematic parameters or its error parameters of the real system as adjustable parameters, and the procedure of judging and deleting redundant parameters in the model is omitted, thus greatly simplifying the modeling procedure of the identification model for calibration. A function relationship between $\rho$ and $\alpha$ is constructed:

$$\rho(q,\alpha)=\rho_0+Z(q)\alpha,\ \rho_0=\begin{pmatrix}q\\0\end{pmatrix},\ Z(q)=\text{diag}[z(q)]_6;$$

where z(q) indicates a function vector with the same dimension as $\alpha$ in which q is an independent variable. In this embodiment, a pose measurement value of the real system is acquired on the basis of the constructed function relationship between $\rho$ and $\alpha$, and based on an iterative algorithm, an estimator $\hat{\alpha}_i$ of the adjustable constant parameter vector $\alpha$ is calculated in a decoupling manner in a joint space. In this embodiment, decoupling identification is carried out in the joint space, which can greatly improve the identification efficiency and the robustness of the identification result. In this embodiment, for the received motion trajectory instruction set, the error compensation and modification can be performed on the driving joint variable corresponding to the motion trajectory instruction set online only according to z(q) and $\hat{\alpha}_i$, and the robot can be driven to move according to the modified driving joint variable.

Embodiment 2

In some embodiments, according to the robot calibration method based on the equivalent kinematic model, acquiring a pose measurement value of the real system, and based on an iterative algorithm, calculating an estimator $\hat{\alpha}_i$ of the adjustable constant parameter vector $\alpha$ in a decoupling manner in a joint space includes:

acquiring a pose measurement value $y_j$ of an output member at a configuration j (j=1~N) of the real system;

assuming that $$\hat{\alpha}_i^k\ (i=1\sim 6,\ k=0,1,\ \ldots\ )$$

is a k-th iteration value of $\alpha_i$, and assuming that $$\hat{\alpha}_i^0=0;$$

performing first-order Taylor expansion on $f(\rho(q_j,\hat{\alpha}),\beta_0)$ in a neighborhood of $$\hat{\alpha}_i^k,$$

and expressing a residual of $y_j$ and $f(\rho(q_j,\hat{\alpha}),\beta_0)$ as:

$$e_j^k=\Delta y_j^k-T_j^k\Delta\alpha^k$$

$$\Delta y_j^k=y_j-f(\rho(q_j,\hat{\alpha}^k),\beta_0),$$

$$T_j^k=\frac{\partial f(\rho(q_j,\alpha),\beta_0)}{\partial\rho}\Big|_{\alpha-\hat{\alpha}_k},\ Z_j=Z(q_j),\ \Delta\alpha^k=\alpha-\hat{\alpha}^k;$$

realizing decoupling in the joint space by simultaneous left multiplication of $$(W_j^k)^T=(T_j^k)^{-1}$$

at both ends of $$e_j^k=\Delta y_j^k-T_j^kZ_j\Delta\alpha^k,$$

and grouping and integrating a multivariate linear regression equation;

$$\Delta\rho_i^k=H\Delta\alpha_i^k+\varepsilon_i^k,$$

$$\Delta\rho_i^k=\begin{pmatrix}(w_{1,i}^k)^T\Delta y_1^k\\ \vdots\\ (w_{N,i}^k)^T\Delta y_N^k\end{pmatrix},\ H=\begin{pmatrix}z_1^T\\ \vdots\\ z_N^T\end{pmatrix},\ \varepsilon_i^k=\begin{pmatrix}(w_{1,i}^k)^Te_1^k\\ \vdots\\ (w_{N,i}^k)^Te_N^k\end{pmatrix};$$

wherein $$w_{j,i}^k$$

indicates an i-th column of a matrix $$W_j^k;$$

obtaining $$\Delta a_i^k$$

by calculation based on a preset algorithm;

updating $$\hat{\alpha}_i^k=:\hat{\alpha}_i^k+\Delta\hat{\alpha}_i^k,$$

executing iterative loop until convergence, and taking a convergence value as the estimator $\hat{\alpha}_i$.

In this embodiment, prior to acquiring a pose measurement value of the real system, and based on an iterative algorithm, calculating an estimator $\hat{\alpha}_i$ of the adjustable constant parameter vector $\alpha$ in a decoupling manner in a joint space, the method further constructs an analytical model or a numerical model of full kinematic Jacobian $T=\partial f/\partial\rho$ and full dynamic Jacobian $W=T^{-T}$ of the equivalent system.

In this embodiment, $$\Delta\alpha_i^k$$

can be obtained by calculation based on, but not limited to, a damped least square method.

In this embodiment, $f(\rho(q_j,\hat{\alpha}),\beta_0)$ is the predicted value of the forward position solution model of the equivalent system at the configuration j (j=1~N). $y_j$ is the measured value of the pose of the output member at the configuration j (j=1~N). Decoupling is realized in the joint space by calculating the residual $$e_j^k = \Delta y_j^k - T_j^k Z_j \Delta\alpha^k$$

between $y_j$ and $f(\rho(q_j,\hat{\alpha}),\beta_0)$ and simultaneous left multiplication of $$(W_j^k)^T = (T_j^k)^{-1}$$

at both ends of $$e_j^k = \Delta y_j^k - T_j^k Z_j \Delta\alpha^k.$$

A multivariate linear regression problem is grouped and integrated. Thereafter, the iteration of the adjustable constant parameter vector $\alpha$ is completed, and the estimator $\hat{\alpha}_i$ of $\alpha$ is obtained. In this embodiment, decoupling identification can be carried out in the joint space, which can greatly improve the identification efficiency and the robustness of the identification result.

Embodiment 3

In some embodiments, according to the robot calibration method based on the equivalent kinematic model, acquiring a pose measurement value $y_j$ of an output member at the configuration j (j=1~N) includes:

- evenly selecting $N>n=\dim(\alpha_i)$ measurement configurations in a robot workspace, and determining a pose instruction set $\{y_0\}$ corresponding to the configuration;
- obtaining an inverse position solution model $f^{-1}(\cdot)$ of the equivalent system according to the forward position solution model $f(\cdot)$ of the equivalent system;
- based on the inverse position solution model $f^{-1}(\cdot)$ of the equivalent system, mapping a pose vector $y_{0,j}$ of the output member at a configuration j to the total joint variable $\rho_{0,j}$ of the equivalent system;
- constructing a driving joint variable $q_j$ of the real system according to the total joint variable $\rho_{0,j}$ of the equivalent system;
- driving the robot to traverse the configuration j;
- measuring coordinates of a preset measuring target point of a calibration gauge on the robot in a calibration coordinate system;
- obtaining a pose measurement value $y_j$ of the output member at a configuration j (j=1~N) based on the coordinate.

Figure 5:
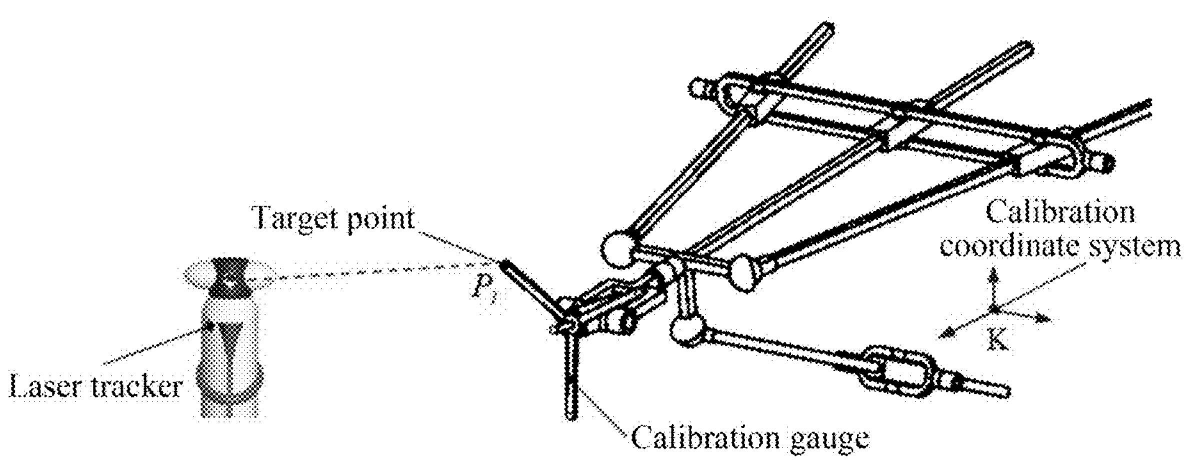
FIG. 5 is a simplified diagram of a mechanical structure of a robot when calibrating a target point according to an embodiment of the present disclosure.

Preferably, referring to FIG. 5, in this embodiment, the coordinates of three target points $P_l$ (l=1~3) preset by the calibration gauge on the robot in the calibration coordinate system K are measured based on the laser tracker.

In this embodiment, the estimated value $\hat{\alpha}$; can be obtained according to the method in the Embodiment 2 after the measured value $y_j$ of the pose of the output member at the configuration j (j=1~N) is obtained.

Embodiment 4

In some embodiments, according to the robot calibration method based on the equivalent kinematic model, modifying a driving joint variable corresponding to a received motion trajectory instruction set according to z(q) and $\hat{\alpha}_i$ includes:

- based on the inverse position solution model $f^{-1}(\cdot)$ of the equivalent system, mapping the received motion trajectory instruction set to an instruction set $\{\rho_0\}$ of the equivalent system for the driving joint variable;
- constructing an instruction set {q} of the real system for the driving joint variables according to $\{\rho_0\}$;
- modifying {q} according to z(q) and $\hat{\alpha}_i$ based on a pre-constructed error compensation modification formula $\{q_{m,i}\}=\{q_i-z^T(q)\hat{\alpha}_i\}$, in which i=1~5, and obtaining the modified instruction set $\{q_{m,i}\}$ of the driving joint variable.

In this embodiment, an embedded error compensator can be developed in the open numerical control system, and z(q) is written into an inverse solution program buffer at the position of a motion control card, and the identified $\hat{\alpha}_i$ is written into a variable register for later call.

In this embodiment, if the motion trajectory instruction set is directly received, the received motion trajectory instruction set is mapped to the instruction set $\{\rho_0\}$ of the equivalent system for the driving joint variables. If a cutter location file is received, the cutter location file is discretized into a motion trajectory instruction set according to the rough interpolation period, and then the motion trajectory instruction set is mapped into an instruction set $\{\rho_0\}$ of an equivalent system for the driving joint variables.

Finally, z(q) and $\hat{\alpha}_i$ are called, and $\{q_i\}$ (i=1~5) is modified by an error compensator based on the error compensation modification formula $\{q_{m,i}\}=\{q_i-z^T(q)\hat{\alpha}_i\}$.

The modified $\{q_{m,i}\}$ is downloaded to a data buffer, and is sent to the servo shaft of each driving joint of the robot after fine interpolation, so as to drive the robot to move, and then realize the pose error compensation of the output member of the real system on the trajectory segment on line.

Embodiment 5

In some embodiments, according to the robot calibration method based on the equivalent kinematic model, constructing a function relationship between $\rho$ and $\alpha$ includes:

expressing each component $\rho_i$ (i=1~6) of $\rho$ as a quadratic response surface function with each component $q_1$~$q_5$ of q as an independent variable:

$$\rho_i = q_i + \mu_{0,i} + \sum_{j=1}^{5}\mu_{j,i}q_j + \sum_{j=1}^{5}\sum_{k=j}^{5}\mu_{j,k,i}q_jq_k,\ i = 1 \sim 6,\ q_6 = 0;$$

where $\mu_{*,*,i}$ indicates coefficients of the quadratic response surface;

obtaining the following formula by variable substitution:

$\rho_i=q_i+z^T(q)\alpha_i$, where $i$=1~6, $q_6$=0;

wherein:

$$z(q) = (1\ z_l\ \dots\ z_n)^T = \left(1\ q_1\ \dots\ q_5\ q_1^2\ q_1q_2\ \dots\ q_5^2\right)^T,$$

$$\alpha_i = (\alpha_{0,i}\ \alpha_{1,i}\ \dots\ \alpha_{n,i})^T = (\mu_{0,i}\ \mu_{1,i}\ \dots\ \mu_{5,i}\ \mu_{1,1i}\ \mu_{1,2,i}\ \dots\ \mu_{5,5,i})^T,\ i = 1 \sim 6.$$

In this embodiment, considering that the total joint variable $\rho$ of the equivalent system is an unknown quantity that change with the configuration, each component $\rho_i$ (i=1~6) thereof is expressed as a quadratic response surface function with each component $q_1$~$q_5$ of q as an independent variable.

In this embodiment, $\mu_{*,*j}$ indicates coefficients of the quadratic response surface, which are a set of constants to be determined. In this embodiment, for the robot shown in Embodiment 1, $n+1=\dim(\alpha_i)=21$.

Embodiment 6

Figure 6:
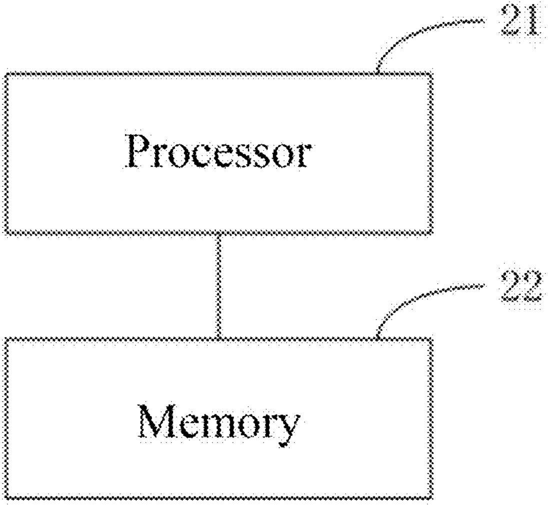
FIG. 6 is a schematic structural diagram of a robot calibration device based on an equivalent kinematic model according to an embodiment of the present disclosure.

A robot calibration device based on an equivalent kinematic model, as shown in FIG. 6, includes:

a processor 21 and a memory 22;

wherein the processor 21 is connected with the memory 22 through a communication bus;

wherein the processor 21 is configured to call and execute a program stored in the memory 22;

the memory 22 is configured to store a program, and the program is at least configured to execute the robot calibration method based on the equivalent kinematic model in any of the above embodiments.

It can be understood that the same or similar parts in the above-mentioned embodiments can refer to each other. The content which is not explained in detail in some embodiments can refer to the same or similar parts in other embodiments.

It should be noted that in the description of the present disclosure, the terms "first" and "second" are only used for the purpose of description and cannot be understood as indicating or implying relative importance. In addition, in the description of the present disclosure, unless otherwise specified, "a plurality of" means at least two.

Any process or method in the flowchart or otherwise described herein can be understood as representing a module, a segment or a part of a code that includes one or more executable instructions for implementing specific logical functions or steps of the process, and the scope of preferred embodiments of the present disclosure includes other implementations, in which functions can be performed out of the order shown or discussed, including in a substantially simultaneous manner or in a reverse order according to the functions involved, which should be understood by those skilled in the art to which embodiments of the present disclosure belong.

It should be understood that various parts of the present disclosure can be implemented in hardware, software, firmware or a combination thereof. In the above embodiments, a plurality of steps or methods can be implemented by software or firmware stored in a memory and executed by an appropriate instruction execution system. For example, if the steps or methods are implemented by hardware, as in another embodiment, the steps or methods can be implemented by any one of the following technologies known in the art or the combination thereof: a discrete logic circuit with a logic gate for implementing a logic function on a data signal, an application specific integrated circuit with a suitable combinational logic gate, a Programmable Gate Array (PGA), a Field Programmable Gate Array (FPGA), etc.

Those skilled in the art can understand that all or part of the steps carried by the method of the above embodiments can be implemented by instructing related hardware through a program. The program can be stored in a computer-readable storage medium. The program, when executed, includes one of the steps of the method embodiment or the combination thereof.

In addition, each functional unit in each embodiment of the present disclosure can be integrated in one processing module, or each unit can exist physically alone, or two or more units can be integrated in one module. The above integrated modules can be implemented in the form of hardware or software functional modules. The integrated module can also be stored in a computer-readable storage medium if it is implemented in the form of a software functional module and sold or used as an independent product.

The storage medium mentioned above can be a read-only memory, a magnetic disk or an optical disk, etc.

In the description of this specification, descriptions referring to the terms "one embodiment", "some embodiments", "examples", "specific examples" or "some examples" mean that specific features, structures, materials or characteristics described in connection with this embodiment or example are included in at least one embodiment or example of the present disclosure. In this specification, the schematic expressions of the above terms do not necessarily refer to the same embodiment or example. Moreover, the specific features, structures, materials or characteristics which haven described may be combined in any one or more embodiments or examples in a suitable manner.

Although the embodiments of the present disclosure have been shown and described above, it can be understood that the above embodiments are exemplary and cannot be understood as limitations of the present disclosure. Those skilled in the art can make changes, modifications, substitutions and variations to the above embodiments within the scope of the present disclosure.

What is claimed is:

1. A robot calibration method based on an equivalent kinematic model, comprising:

calibrating a robot real system with a degree of freedom of $f\leq 6$ and containing multiple types of time-invariant error sources as a kinematic equivalent system with six degrees of freedom; wherein 6-dimensional pose vectors y of output members of the equivalent system and the real system are the same, and the equivalent system comprises a forward position solution model: $y=f(\rho(q,\alpha),\beta_0)$; where $\beta_0$ is a nominal value of a known kinematic parameter of the real system, $\rho$ is a total joint variable of the equivalent system, q is a driving joint variable of the real system, and $\alpha$ is an adjustable constant parameter vector;

constructing a function relationship between $\rho$ and $\alpha$:

$$\rho(q,\alpha)=\rho_0+Z(q)\alpha,\ \rho_0=\begin{pmatrix} q \\ 0 \end{pmatrix},\ Z(q)=\mathrm{diaq}[z(q)]_6;$$

where z(q) indicates a function vector with the same dimension as $\alpha$ in which q is an independent variable;

acquiring a pose measurement value of the real system, and based on an iterative algorithm, calculating an estimator $\hat{\alpha}_i$ of the adjustable constant parameter vector $\alpha$ in a decoupling manner in a joint space;

modifying a driving joint variable corresponding to a received motion trajectory instruction set according to z(q) and $\hat{\alpha}_i$; and driving the robot to move according to the modified driving joint variable.

2. The robot calibration method based on the equivalent kinematic model according to claim 1, wherein acquiring a pose measurement value of the real system, and based on an iterative algorithm, calculating an estimator $\hat{\alpha}_i$ of the adjustable constant parameter vector $\alpha$ in a decoupling manner in a joint space comprises:

acquiring a pose measurement value $y_j$ of an output member at a configuration j (j=1~N) of the real system;

assuming that $$\hat{\alpha}_i^k (i = 1 \sim 6, k = 0, 1, \ldots)$$

is a k-th iteration value of $\alpha_i$, and assuming that $$\hat{\alpha}_i^0 = 0;$$

performing first-order Taylor expansion on $f(\rho(q_j,\hat{\alpha}),\beta_0)$ in a neighborhood of $$\hat{\alpha}_i^0,$$

and expressing a residual of $y_j$ and $f(\rho(q_j,\hat{\alpha}),\beta_0)$ as:

$$e_j^k = \Delta y_j^k - T_j^k Z_j \Delta\alpha^k$$

$$\Delta y_j^k = y_j - f(\rho(q_j, \hat{\alpha}^k), \beta_0),$$

$$T_j^k = \frac{\partial f(\rho(q_j, \alpha), \beta_0)}{\partial \rho}\Big|_{\alpha - \hat{\alpha}_k}, Z_j = Z(q_j), \Delta\alpha^k = \alpha - \hat{\alpha}^k;$$

realizing decoupling in the joint space by simultaneous left multiplication of $$(W_j^k)^T = (T_j^k)^{-1}$$

at both ends of $$e_j^k = \Delta y_j^k - T_j^k Z_j \Delta\alpha^k,$$

and grouping and integrating a multivariate linear regression equation;

$$\Delta\rho_i^k = H\Delta\alpha_i^k + \varepsilon_i^k,$$

$$\Delta\rho_i^k = \begin{pmatrix} (w_{1,i}^k)^T \Delta y_1^k \\ \vdots \\ (w_{N,i}^k)^T \Delta y_N^k \end{pmatrix}, H = \begin{pmatrix} z_1^T \\ \vdots \\ z_N^T \end{pmatrix}, \varepsilon_i^k = \begin{pmatrix} (w_{1,i}^k)^T e_1^k \\ \vdots \\ (w_{N,i}^k)^T e_N^k \end{pmatrix};$$

wherein $$w_{j,i}^k$$

indicates an i-th column of a matrix $$W_j^k;$$

obtaining $$\Delta\alpha_i^k$$

by calculation based on a preset algorithm;

updating $$\hat{\alpha}_i^k =: \hat{\alpha}_i^k + \Delta\hat{\alpha}_i^k,$$

executing iterative loop until convergence, and taking a convergence value as the estimator $\hat{\alpha}_i$.

3. The robot method based on the equivalent kinematic model according to claim 2, wherein acquiring a pose measurement value $y_j$ of an output member at the configuration j (j=1~N) comprises:

evenly selecting $N>n=\dim(\alpha_i)$ measurement configurations in a robot workspace, and determining a pose instruction set $\{y_0\}$ corresponding to the configuration;

obtaining an inverse position solution model $f^{-1}(\cdot)$ of the equivalent system according to the forward position solution model $f(\cdot)$ of the equivalent system;

based on the inverse position solution model $f^{-1}(\cdot)$ of the equivalent system, mapping a pose vector $y_{0,j}$ of the output member at a configuration j to the total joint variable $\rho_{0,j}$ of the equivalent system;

constructing a driving joint variable $q_j$ of the real system according to the total joint variable $\rho_{0,j}$ of the equivalent system;

driving the robot to traverse the configuration j;

measuring coordinates of a preset measuring target point of a calibration gauge on the robot in a calibration coordinate system;

obtaining a pose measurement value $y_j$ of the output member at a configuration j (j=1~N) based on the coordinate.

4. The robot calibration method based on the equivalent kinematic model according to claim 3, wherein modifying a driving joint variable corresponding to a received motion trajectory instruction set according to z(q) and $\hat{\alpha}_i$, comprises:

based on the inverse position solution model $f^{-1}(\cdot)$ of the equivalent system, mapping the received motion trajectory instruction set to an instruction set $\{\rho_0\}$ of the equivalent system for the driving joint variable;

constructing an instruction set {q} of the real system for the driving joint variables according to $\{\rho_0\}$;

modifying {q} according to z(q) and $\hat{\alpha}_i$ based on a pre-constructed error compensation modification formula $\{q_{m,i}\}=\{q_i-z^T(q)\hat{\alpha}_i\}$, in which i=1~5, and obtaining the modified instruction set $\{q_{m,i}\}$ of the driving joint variable.

5. The robot calibration method based on the equivalent kinematic model according to claim 4, wherein the method further comprises:

interpolating the modified instruction set $\{q_{m,i}\}$ of the driving joint variable.

6. The robot calibration method based on the equivalent kinematic model according to claim 1, wherein constructing a function relationship between ρ and α comprises:

expressing each component $\rho_i$ (i=1~6) of ρ as a quadratic response surface function with each component $q_1$~$q_5$ of q as an independent variable:

$$\rho_i = q_i + \mu_{0,i} + \sum_{j=1}^{5}\mu_{j,i}q_j + \sum_{j=1}^{5}\sum_{k=j}^{5}\mu_{j,k,i}q_jq_k,\ i = 1 \sim 6,\ q_6 = 0;$$

where $\mu_{*,*,j}$ indicates coefficients of the quadratic response surface;

obtaining the following formula by variable substitution:

$\rho_i = q_i + z^T(q)\alpha_i$, where $i=1$~$6$, $q_6=0$;

wherein:

$$z(q) = (1\ z_l\ \dots\ z_n)^T = \left(1\ q_1\ \dots\ q_5\ q_1^2\ q_1q_2\ \dots\ q_5^2\right)^T,$$

$$\alpha_i = (\alpha_{0,i}\ \alpha_{1,i}\ \dots\ \alpha_{n,i})^T = (\mu_{0,i}\ \mu_{1,i}\ \dots\ \mu_{5,i}\ \mu_{1,1i}\ \mu_{1,2,i}\ \dots\ \mu_{5,5,i})^T,\ i = 1 \sim 6.$$

7. The robot calibration method based on the equivalent kinematic model according to claim 1, wherein the function relationship between ρ and α is a linear function or a nonlinear function.

8. The robot calibration method based on the equivalent kinematic model according to claim 2, wherein obtaining $$\Delta a_i^k$$

by calculation based on a preset algorithm comprises:

obtaining $$\Delta a_i^k$$

by calculation based on a damped least square method.

9. The robot calibration method based on the equivalent kinematic model according to claim 2, wherein prior to acquiring a pose measurement value of the real system, and based on an iterative algorithm, calculating an estimator $\hat{\alpha}_i$ of the adjustable constant parameter vector α in a decoupling manner in a joint space, the method further comprises:

constructing an analytical model or a numerical model of full kinematic Jacobian $T=\partial f/\partial\rho$ and full dynamic Jacobian $W=T^{-T}$ of the equivalent system.

10. A robot calibration device based on an equivalent kinematic model, comprising:

a processor and a memory;

wherein the processor is connected with the memory through a communication bus;

wherein the processor is configured to call and execute a program stored in the memory;

the memory is configured to store a program, and the program is at least configured to execute the robot calibration method based on the equivalent kinematic model according to claim 1.

* * * * *